US006195151B1

(12) United States Patent
Parthasarathy et al.

(10) Patent No.: US 6,195,151 B1
(45) Date of Patent: Feb. 27, 2001

(54) MEDIA HANDLING SYSTEM FOR DUPLEX PRINTING

(75) Inventors: Baskar Parthasarathy; Danny Lian Hock Ng; Chuin Kiat Lim, all of Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/406,969

(22) Filed: Sep. 28, 1999

(51) Int. Cl.[7] .......................... G03B 27/00; G03G 15/00; G01D 15/24

(52) U.S. Cl. ................................ 355/24; 355/18; 355/23; 399/361; 399/363; 399/364; 346/134

(58) Field of Search ................................ 355/23, 24, 18; 399/361, 363, 364; 346/134

(56) References Cited

U.S. PATENT DOCUMENTS

| | | | | |
|---|---|---|---|---|
| 4,110,025 | * | 8/1978 | Tabata | 355/24 |
| 4,708,462 | * | 11/1987 | Stemmle | 355/24 |
| 4,908,673 | * | 3/1990 | Muramatsu | 355/311 |
| 5,132,719 | * | 7/1992 | Kioka et al. | 355/24 |
| 5,280,331 | * | 1/1994 | Namiki | 355/318 |
| 5,296,908 | * | 3/1994 | Hatano et al. | 355/319 |
| 5,392,092 | | 2/1995 | Laidlaw et al. . | |
| 5,648,843 | * | 7/1997 | Eguchi | 399/364 |
| 5,772,343 | | 6/1998 | Beretta et al. . | |
| 5,784,680 | * | 7/1998 | Taruki | 399/374 |
| 6,029,020 | * | 2/2000 | Blackman et al. | 399/45 |

* cited by examiner

*Primary Examiner*—Russell Adams
*Assistant Examiner*—Khaled Brown

(57) ABSTRACT

A media sheet handling system for duplex printing is disclosed. During duplex printing, the media sheet whose first side is printed is directed into a duplex print path, wherein the media sheet is reversed to a flipped over state with respect to its original position and the original leading edge is maintained to be the leading edge for subsequent printing.

20 Claims, 8 Drawing Sheets

MEDIA HANDLING SYSTEM FOR DUPLEX PRINTING

BACKGROUND OF THE INVENTION

This invention relates generally to media sheet handling systems, and more particularly to a printing mechanism that can produce images on both sides of a media sheet.

Printing to two sides of a media sheet, referred to as duplex printing, is a desirable feature in a printing system. The advantages of duplex printing include reducing the amount of paper required in one-sided (simplex) printing, and generating print sets with layouts resembling that of professionally printed books. Conventional duplex printing devices, as exemplified by what is disclosed in U.S. Pat. No. 5,392,092 for "Printing Device Duplexing Mechanism and Method Therefor," flip the media sheet over with respect to its original position and swap the leading edge for the trailing edge in printing a second side of the media sheet. Since the page is now positioned with what was originally the trailing edge as the leading edge, as the second side of the media sheet is printed, the image has to be written in a bottom-to-top and right-to-left manner. Thus the formatter of the printer has to correspondingly reverse the order of the data supplied to the print engine.

In inkjet printers, drying of media sheet brings another major challenge for duplex printing, because a printed side of a media sheet tends to wrap around the drive roller surface when the second side is printed. U.S. Pat. No. 5,772,343 for "Media Handling System for Duplex Printing," provides one solution to duplex printing for such printers. In this solution, the media sheet, after its first side is printed and before it is fed back for printing its second side, has to be held in the air space of the printer output region for a predetermined time period for the wet ink to dry. Since the printer is waiting idly for the drying, printing efficiency therefore is unnecessarily degraded.

Accordingly, there is a need for a convenient and efficient way to realize duplex printing.

SUMMARY OF THE INVENTION

In a preferred embodiment, the invention provides a media sheet handling system for duplex printing that adequately reorients the media sheet while drying of wet ink, if necessary, is accomplished simultaneously.

An embodiment of a media sheet handling system according to the invention includes a first driving roller, an output roller, a detractor, a duplex print path and a second driving roller. A media sheet is picked by a pick roller from a stack of media sheets and fed by the first driving roller towards a printing zone for imprinting images on the first side of the media sheet. The output roller then directs the media sheet whose first side has been printed towards an output path. During duplex printing, after the first side of the media sheet is printed, the detractor between the output roller and the output path is activated to direct the media sheet into the duplex print path. In the duplex print path, the media sheet is reversed to a flipped over state with respect to its original position before the first side is printed, and the original leading edge of the media sheet remains the leading edge for subsequent printing. After the reorientation, the second driving roller supplies the media sheet from the duplex print path for printing the second side of the media sheet. The detractor is inactivated and the media sheet is ejected to the output path after the second side is printed.

In another embodiment according to the invention, the media sheet handling system includes a pick roller, a driving roller, an output roller, a detractor and a duplex print path. Similarly, the pick roller picks a media sheet from a stack of media sheets, and the driving roller feeds the media sheet towards a printing zone for printing the first side of the media sheet. Then the output roller drives the printed media sheet forward, the detractor directs the media sheet whose first side has been printed into the duplex print path, and the duplex print path reorients the media sheet. In the duplex print path, the media sheet is reversed to a flipped over state with respect to its original position before the first side is printed; and the original leading edge of the media sheet remains the leading edge for subsequent printing. After the reorientation, the duplex print path directs the media sheet back onto the top of the stack of media sheet. Subsequently, the media sheet whose first side has been printed is picked by the pick roller and forwarded by the driving roller towards the printing zone for printing its second side. After the duplex printing, the detractor is inactivated, and the media sheet is ejected to the output path.

DETAILED DESCRIPTION OF THE INVENTION

Figure 1:
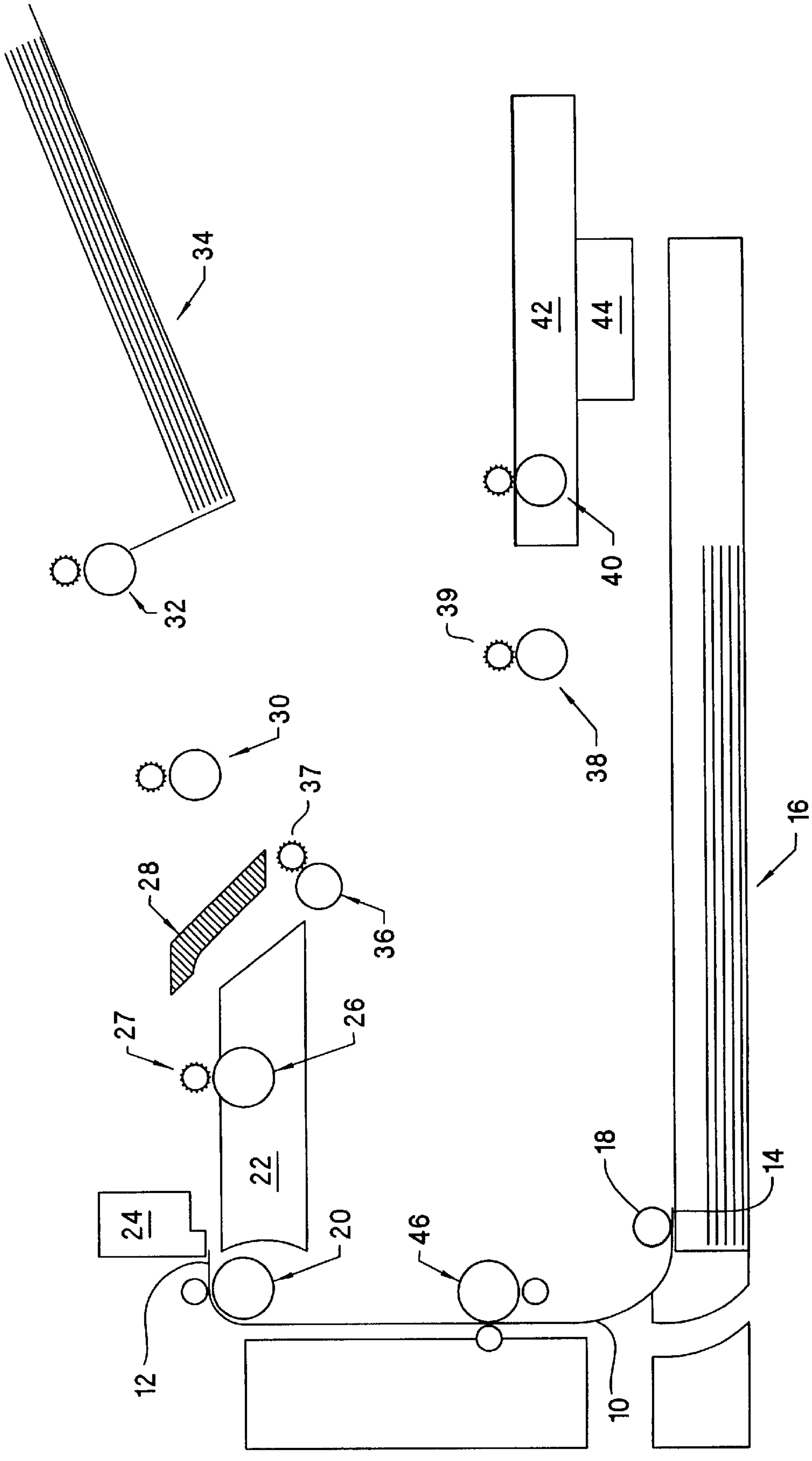
FIGS. 1, 2, 3, 4, 5, 6 and 7 are schematic side views showing different steps of duplex printing of an inkjet printer using a preferred embodiment of the invention.
Figure 2:
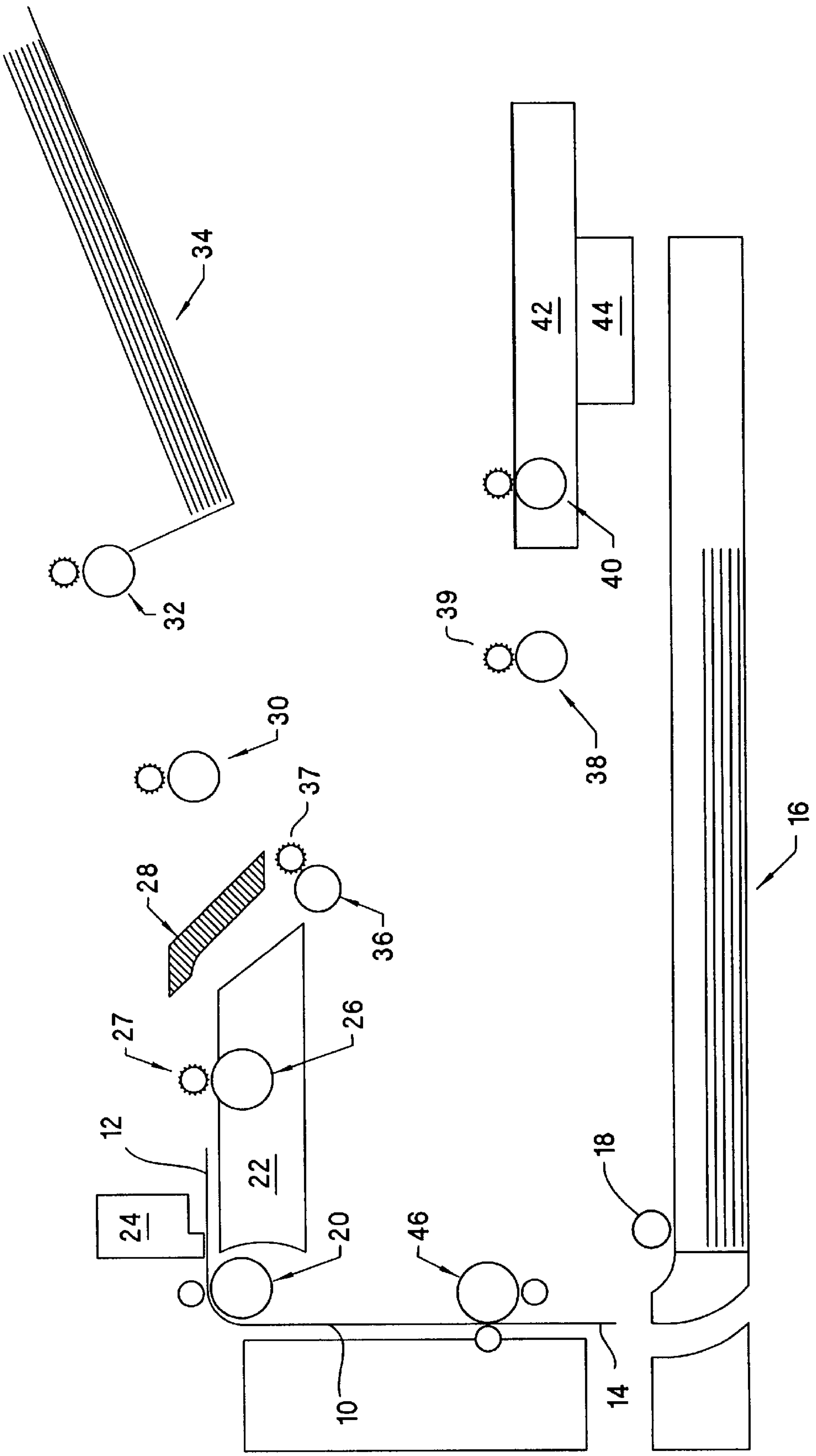
Figure 3:
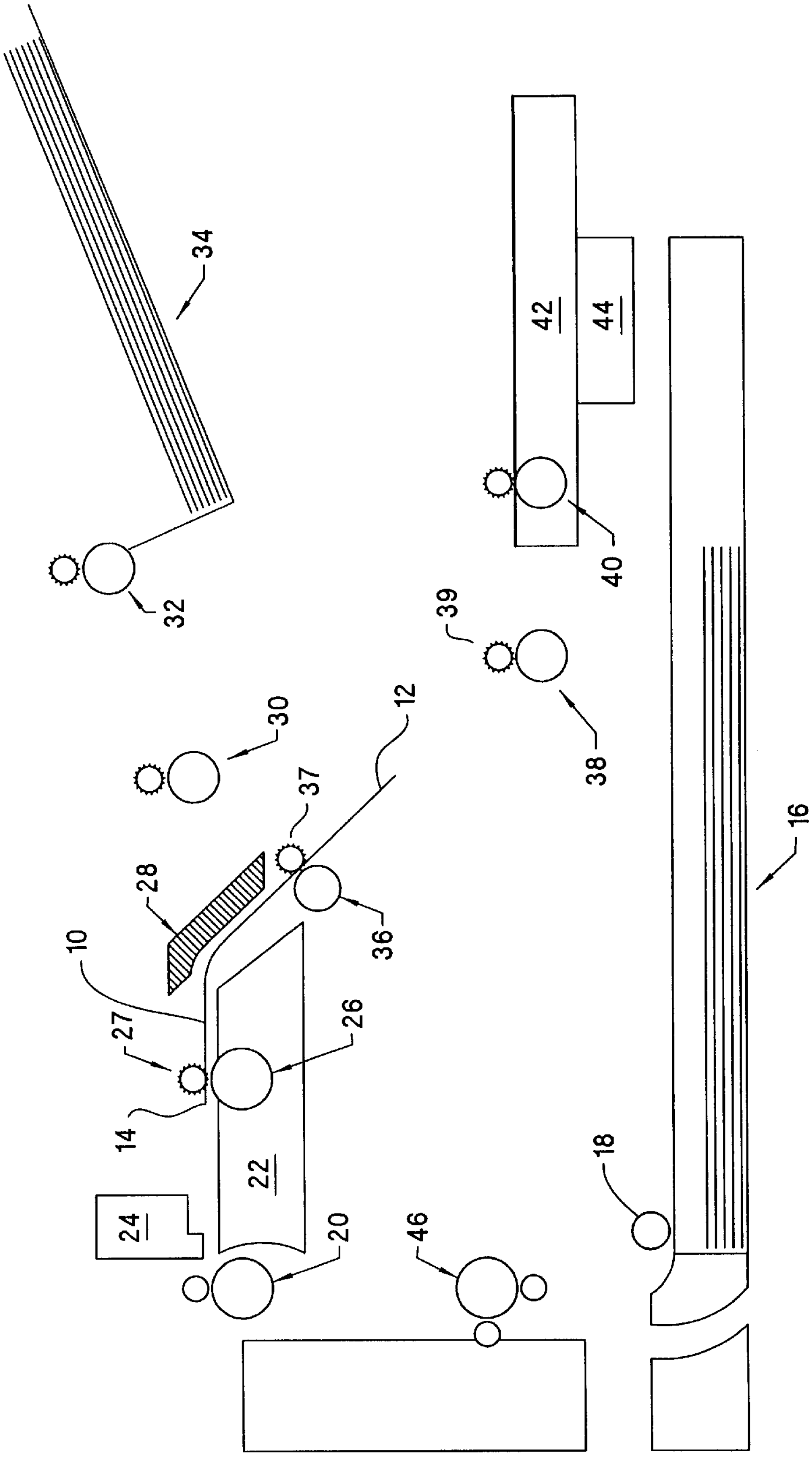

Hereinafter, the invention will be described in the context of an inkjet printer. Nevertheless, it is to be understood that it is equally applicable to any system that employs duplex printing processes.

As shown in FIGS. 1–7, a preferred embodiment of the invention includes a drive roller 20, an output roller 26, a duplex roller 46, a detractor 28 and a duplex print path. The duplex print path has a first duplex intermediate drive 36, a second duplex intermediate drive 38, a duplex hold drive 40, a turn table 42 and a motor 44 coupled to the turn table 42. FIGS. 1–7 are schematic side views showing different steps of duplex printing of an inkjet printer using the preferred embodiment of the invention.

In FIG. 1, a pick roller 18 picks the top sheet of print media off the supply stack in a paper tray 16 and feeds the media sheet 10 towards the drive roller 20. The drive roller 20 further draws and propels the media sheet 10 into a printing zone formed by a printing head 24 and a platen 22 (see FIG. 2). The printing head 24 imprints images on the first side of the media sheet 10 which is facing the printing head 24 as the media sheet 10 passes through the printing zone. When the leading edge 12 of the printed media sheet 10 reaches the output roller 26, the output roller 26 and its mating star wheel 27 propel the media sheet 10 forward.

In normal printing, the media sheet 10 will be fed towards an output path formed by a first output stage 30 and a second output stage 32. The two output stages 30, 32 draw the media sheet 10 forward and eject it into an output tray 34. In duplex printing, however, the detractor 28 located between the output roller and the output path is activated, and the media sheet 10 is thus directed into the duplex print path (see FIG. 3).

Figure 4:
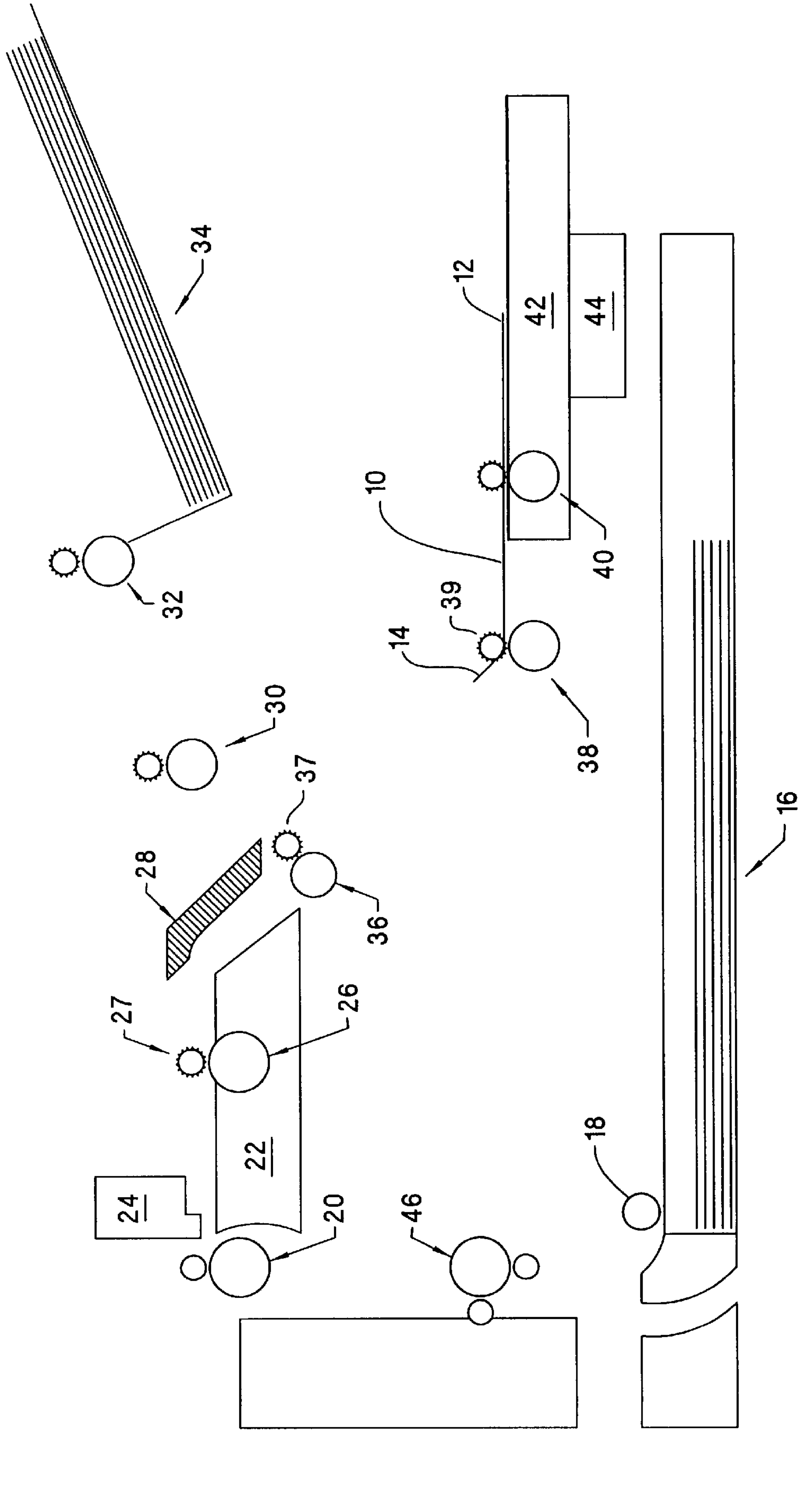
Figure 5:
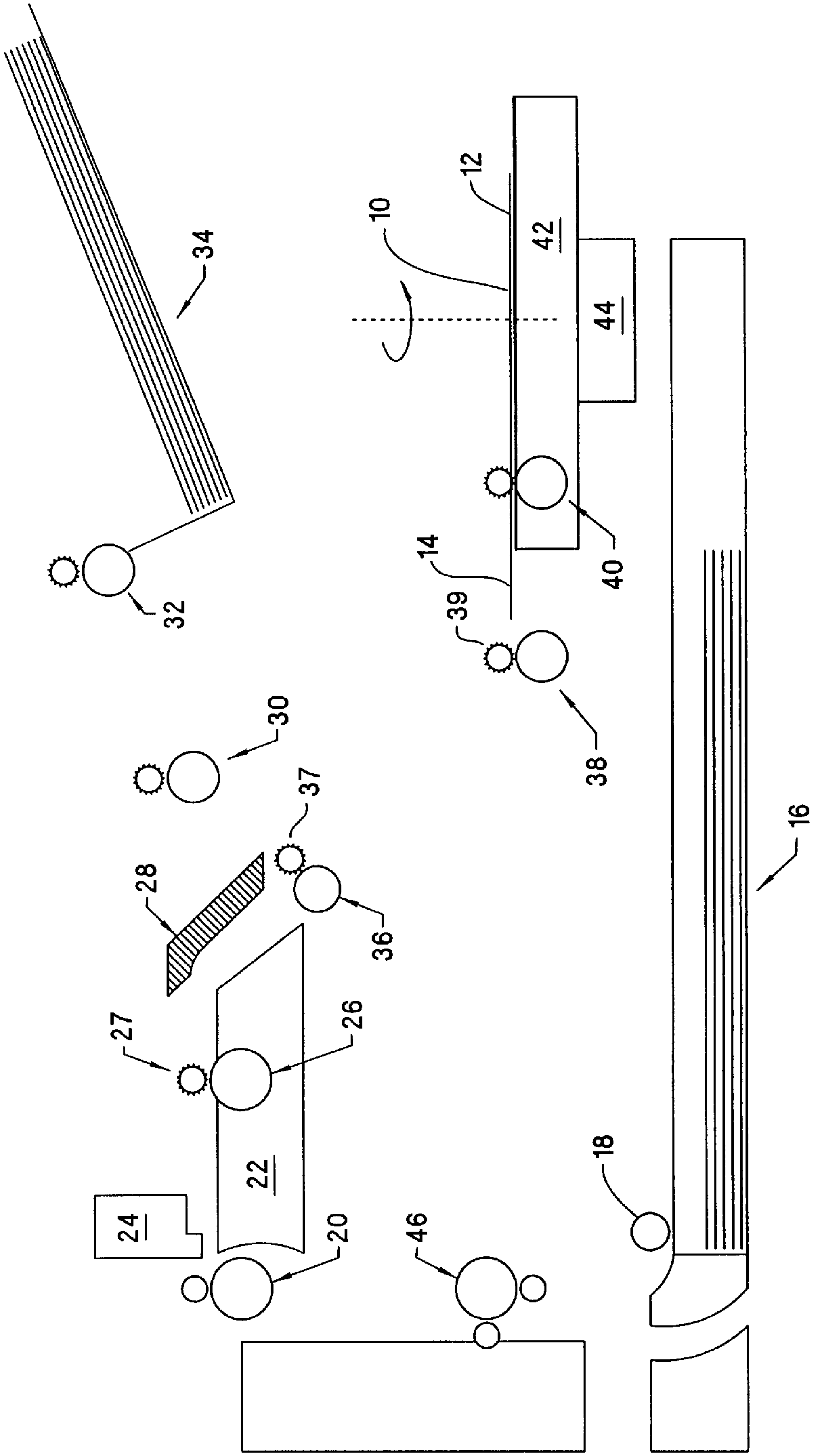
Figure 6:
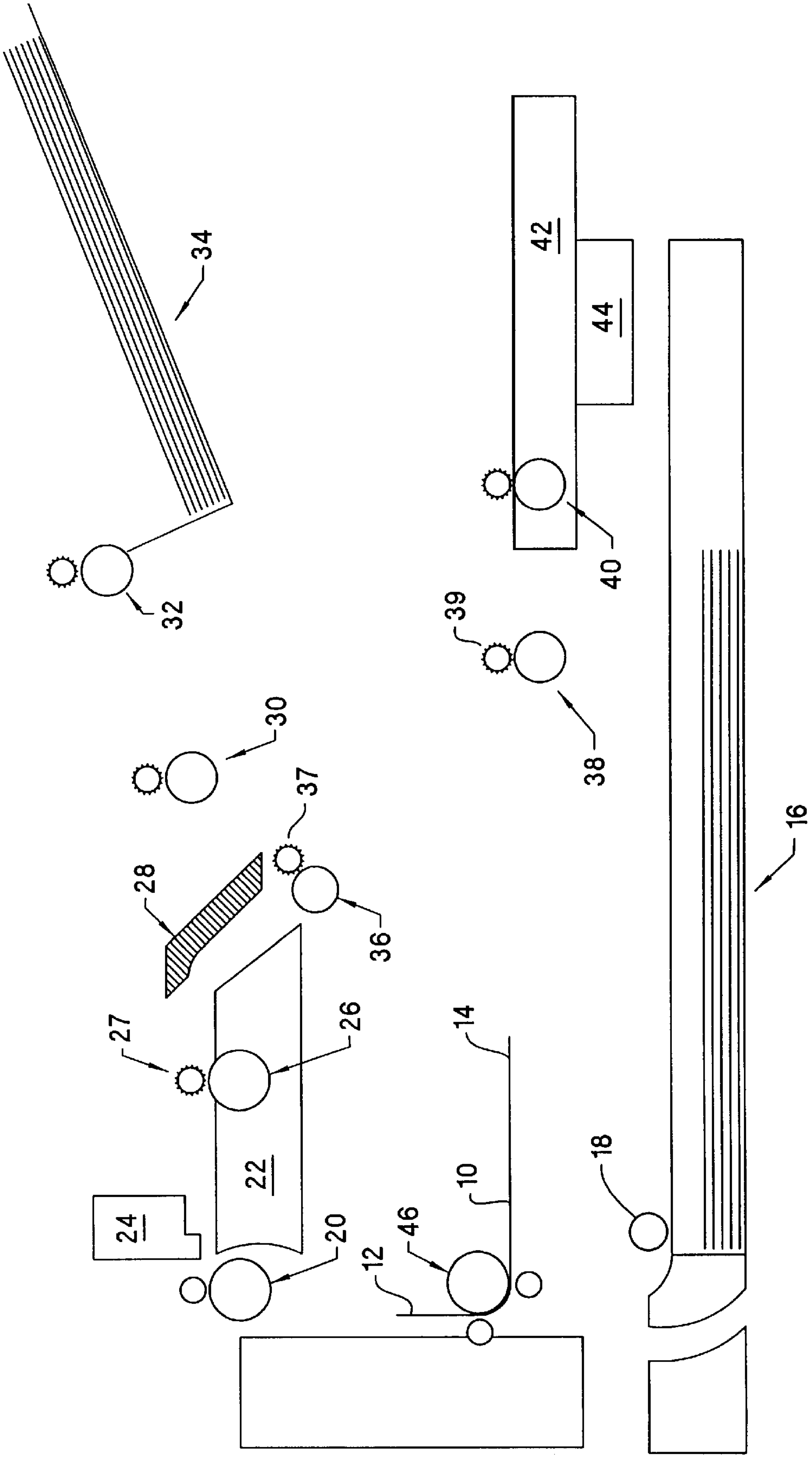
Figure 7:
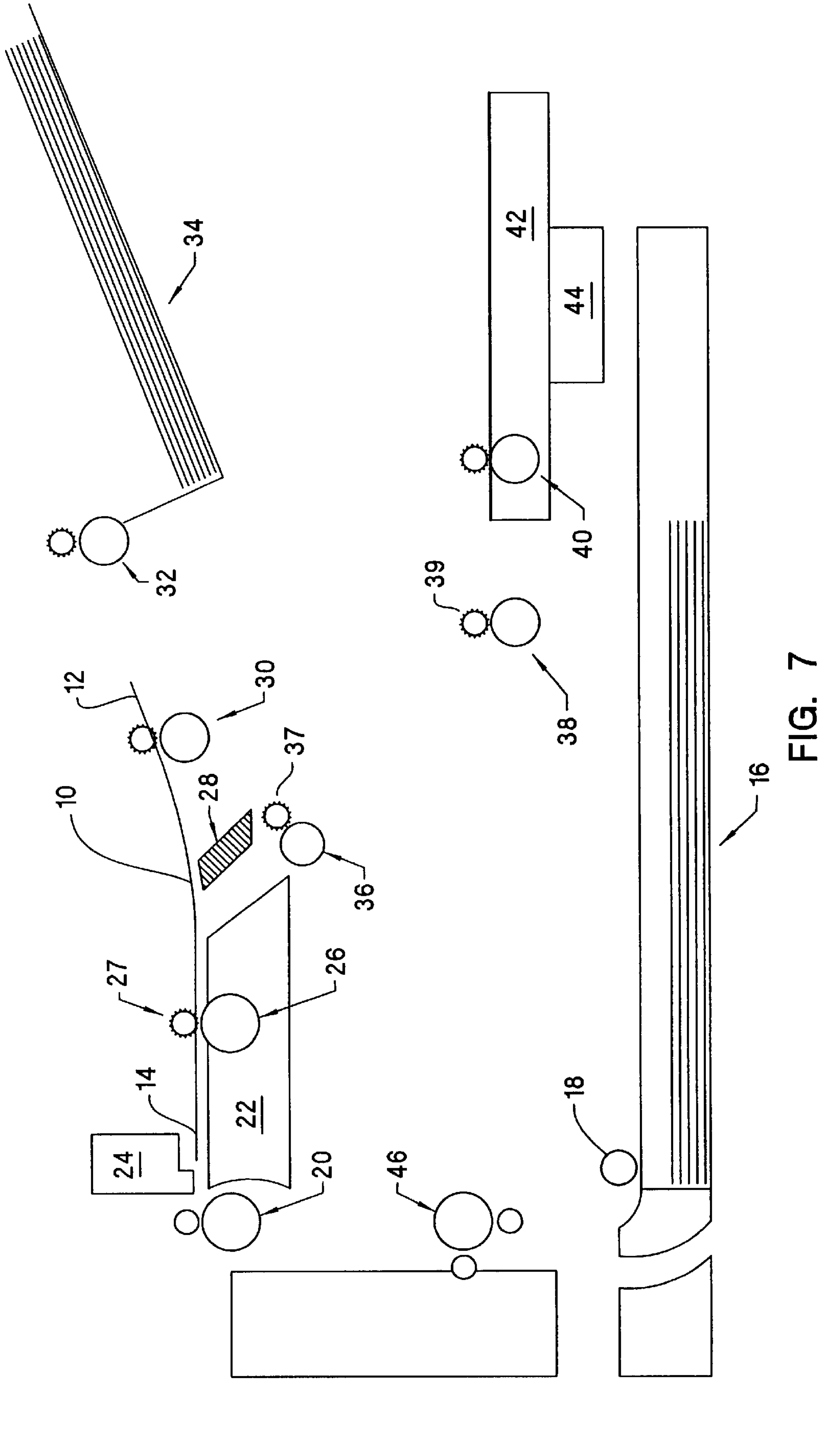

As shown in FIG. 4, the first duplex intermediate drive 36 and its mating star wheel 37 propel the media sheet 10 along the duplex print path. The media sheet 10 goes through the second duplex intermediate drive 38 and its mating star wheel 39, and reaches the duplex hold drive 40, which is positioned on the turn table 42. As the trailing edge 14 of the media sheet 10 crosses the second duplex intermediate drive 38, the duplex hold drive 40 is stopped. Now the media sheet 10 is on the turn table 42 with the printed side (first side) facing upwards (see FIG. 5). Driven by the motor 44, the turn table horizontally rotates 180 degrees, thus bringing the leading edge 12, which has been pointing towards an output direction, now to point towards an input direction, i.e., towards the second duplex intermediate drive 38. During the rotation, the media sheet 10 is held by the duplex hold drive 40 to avoid being shifted. Note that the printed side of the media sheet 10 does not touch the surface of any roller involved in the duplex print path. The drying of the wet ink is simultaneous with the reorientation of the media sheet. The rotative velocity of the turn table 42 is predetermined so that the media sheet 10 is delayed enough for at least partial drying of the wet ink.

Moreover, in this preferred embodiment, the mid-point of the turn table 42 (in media sheet width direction) is designed to be the mid-point of letter and legal size media. Since A4 media is 6 millimeter less than the letter or legal size media in width, when an A4 media sheet is involved in the duplex printing, the A4 media sheet has to be reoriented by being moved by 6 millimeter towards the right end of the turn table 42 to positively touch the datum wall.

After preceding actions, during subsequent printing, the leading edge 12 of the media sheet 10 will remain the leading edge and the printed side will be facing the drive roller 20, i.e., opposite to the printing head 24.

Then the duplex hold drive 40 moves the media sheet 10 towards the second duplex intermediate drive 38. The second duplex intermediate drive 38 starts rotating in such a way that it will pull the media sheet 10 forward. The media sheet is moved forward by the second intermediate drive 38 until it reaches the duplex roller 46. The duplex roller 46 then advances the media sheet 10 towards the drive roller 20 for printing the second side of the media sheet 10 (see FIG. 6). Note that the second duplex intermediate drive 38 may be replaced by another duplex hold drive (not shown) which may be positioned on the other side of the turn table 42 opposite to the duplex hold drive 40. The second duplex hold drive functions similarly to the second duplex intermediate drive 38.

As the media sheet 10 moves towards the printing zone, the previously printed side of the media sheet 10 is facing the drive roller while the non-printed side is facing the printing head 24. And the original leading edge 12 of the media sheet 10 remains the leading edge. Therefore, the printing head 24 imprints images on the non-printed side of the media sheet 10 without changing its manner of printing, i.e., still writing in a top-to-bottom and left-to-right fashion.

The detractor 28 is inactivated when the media sheet 10 reaches the printing zone. Thus, as the printing head prints the second side of the media sheet 10, the output roller 26 and its mating star wheel 27 propel the media sheet 10 towards the output path (see FIG. 7). The first output stage 30 and the second output stage 32 further eject the media sheet 10 whose second side has been printed into the output tray 34. The whole duplex printing process is now completed.

Figure 8:
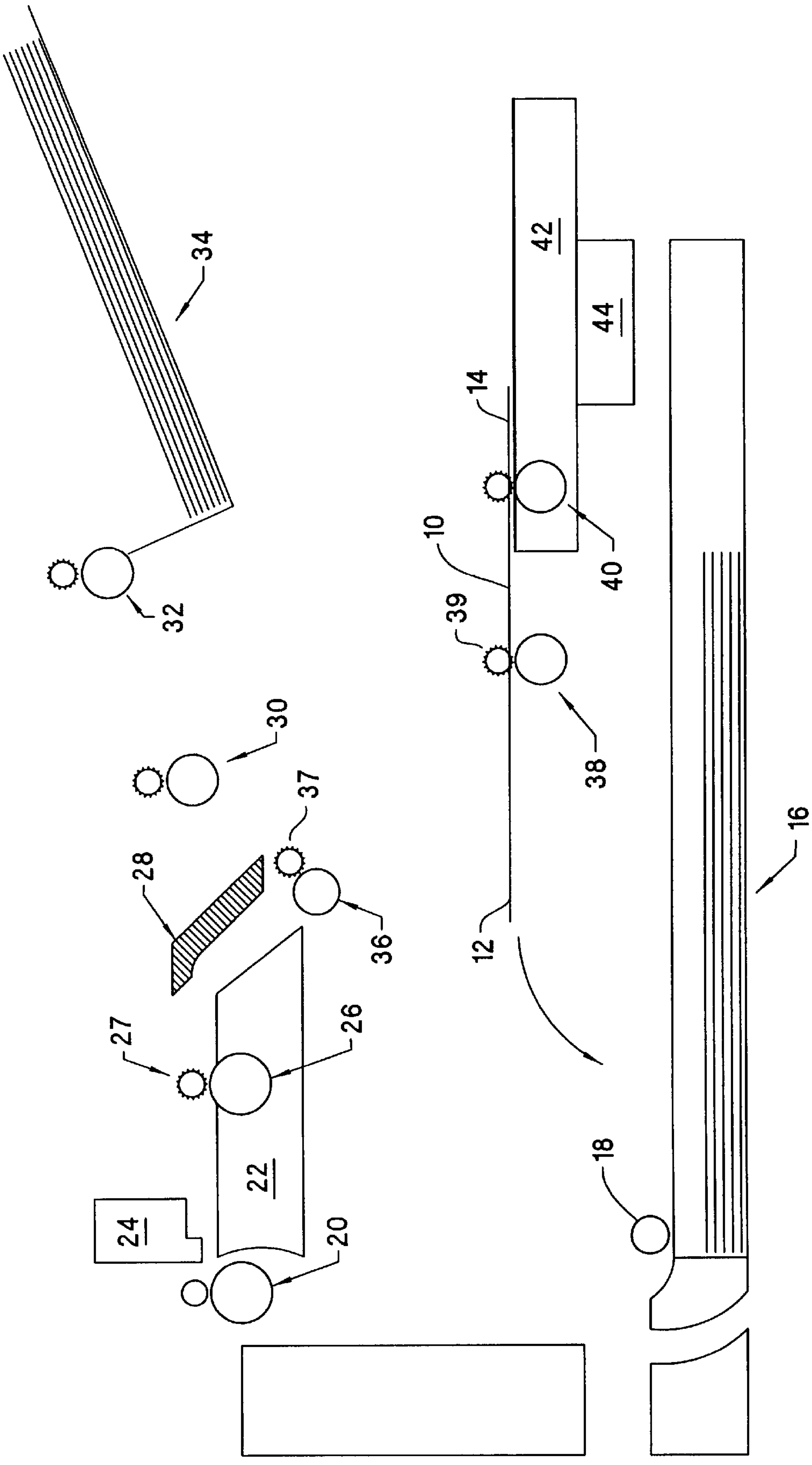
FIG. 8 is a schematic side view showing one step of duplex printing of an inkjet printer using another preferred embodiment of the invention.

FIG. 8 is a schematic side view showing one step of duplex printing of an inkjet printer using another preferred embodiment of the invention. The second preferred embodiment of the invention has a pick roller 18, a drive roller 20, an output roller 26, a detractor 28 and a duplex print path. The duplex print path includes a first duplex intermediate drive 36, a second duplex intermediate drive 38, a duplex hold drive 40, a turn table 42 and a motor 44 coupled to the turn table 42. The duplex printing process in the second embodiment is quite similar to the first one, except that after the duplex print path reorients the media sheet 10 whose first side has been printed, the media sheet 10 is moved back onto the top of the stack of the media sheets. As shown in FIG. 8, the second duplex intermediate drive 38 is positioned just above the paper tray 16. Thus the second duplex intermediate drive 38 propels the reoriented media sheet 10 into the paper tray 16. Subsequently, the sheet 10 whose first side has been printed is picked by the pick roller 18 and forwarded towards the drive roller 20 for printing the second side.

What is claimed is:

1. A media sheet handling system in a printer for enabling printing to a first side and a second side of a media sheet, comprising:

a first driving means for feeding the media sheet towards a printing zone for printing the media sheet;

an output means for directing the media sheet from the printing zone towards an output path;

a detractor located between the output means and the output path, for diverting the media sheet away from the output path after the first side of the media sheet is printed;

a duplex print path communicating with the detractor, for reorienting the media sheet whose first side has been printed in a flipped over state with respect to its original position before the first side is printed and for maintaining the original leading edge of the reoriented media sheet as the leading edge for subsequent printing; and a second driving means for supplying the media sheet from the duplex print path for printing the second side of the media sheet.

2. The system of claim 1, wherein the duplex print path comprises a rotating means for rotating the media sheet, thereby during the process of printing the second side of the media sheet, the original leading edge of the media sheet remains the leading edge.

3. The system of claim 2, wherein the rotating means comprises a movable table and a motor coupled to the table, and the motor horizontally rotates the table 180 degree when the media sheet is placed on the table.

4. The system of claim 3, wherein the rotating means further comprises a duplex hold means for holding the media sheet on the table.

5. The system of claim 4, wherein the duplex hold means feeds the media sheet towards the second driving means after the media sheet has been rotated.

6. The system of claim 2, wherein the duplex print path comprises a first duplex intermediate drive for feeding the media sheet which comes from the output means towards the rotating means.

7. The system of claim 6, wherein the duplex print path comprises a second duplex intermediate drive for working in conjunction with the first duplex intermediate drive to feed the media sheet towards the rotating means.

8. The system of claim 7, wherein the second duplex intermediate drive pulls the media sheet forward when the media sheet has been rotated and is being fed towards the second driving means.

9. The system of claim 1, wherein the second driving means feeds the media sheet coming from the duplex print path towards the first driving means.

10. The system of claim 1, wherein the first driving means comprises a first drive roller and a first outpinch roller coupled thereto.

11. The system of claim 1, wherein the output means comprises an output roller and an output star wheel mating thereto.

12. A media sheet handling system in a printer for enabling printing to a first side and a second side of a media sheet, comprising:

a print media supply means for supplying the media sheet for printing from a stack of media sheets;

a driving means for feeding the media sheet coming from the print media supply means towards a printing zone for printing the media sheet;

an output means for directing the media sheet from the printing zone towards an output path;

a detractor located between the output means and the output path, for diverting the media sheet away from the output path after the first side of the media sheet is printed; and a duplex print path communicating with the detractor, for reorienting the media sheet whose first side has been printed in a flipped over state with respect to its original position, maintaining the original leading edge of the media sheet as the leading edge for subsequent printing, and directing the media sheet back onto the top of the stack of media sheets.

13. The system of claim 12, wherein the duplex print path comprises a rotating means for rotating the media sheet, thereby during the process of printing the second side of the media sheet, the original leading edge of the media sheet remains the leading edge.

14. The system of claim 13, wherein the rotating means comprises a movable table and a motor coupled to the table, and the motor rotates the table 180 degrees when the media sheet is placed on the table.

15. The system of claim 14, wherein the rotating means further comprises a duplex hold means for holding the media sheet on the table.

16. The system of claim 13, wherein the duplex print path comprises means for moving the media sheet from the rotating means to the stack of media sheets.

17. The system of claim 13, wherein the duplex print path comprises a first duplex intermediate drive for feeding the media sheet which comes from the output means towards the rotating means.

18. The system of claim 17, wherein the duplex print path further comprises a second duplex intermediate drive for working in conjunction with the first duplex intermediate drive to feed the media sheet towards the rotating means.

19. The system of claim 12, wherein the driving means comprises a drive roller and an outpinch roller coupled thereto.

20. The system of claim 12, wherein the output means comprises an output roller and an output star wheel mating thereto.

* * * * *